UNITED STATES PATENT OFFICE.

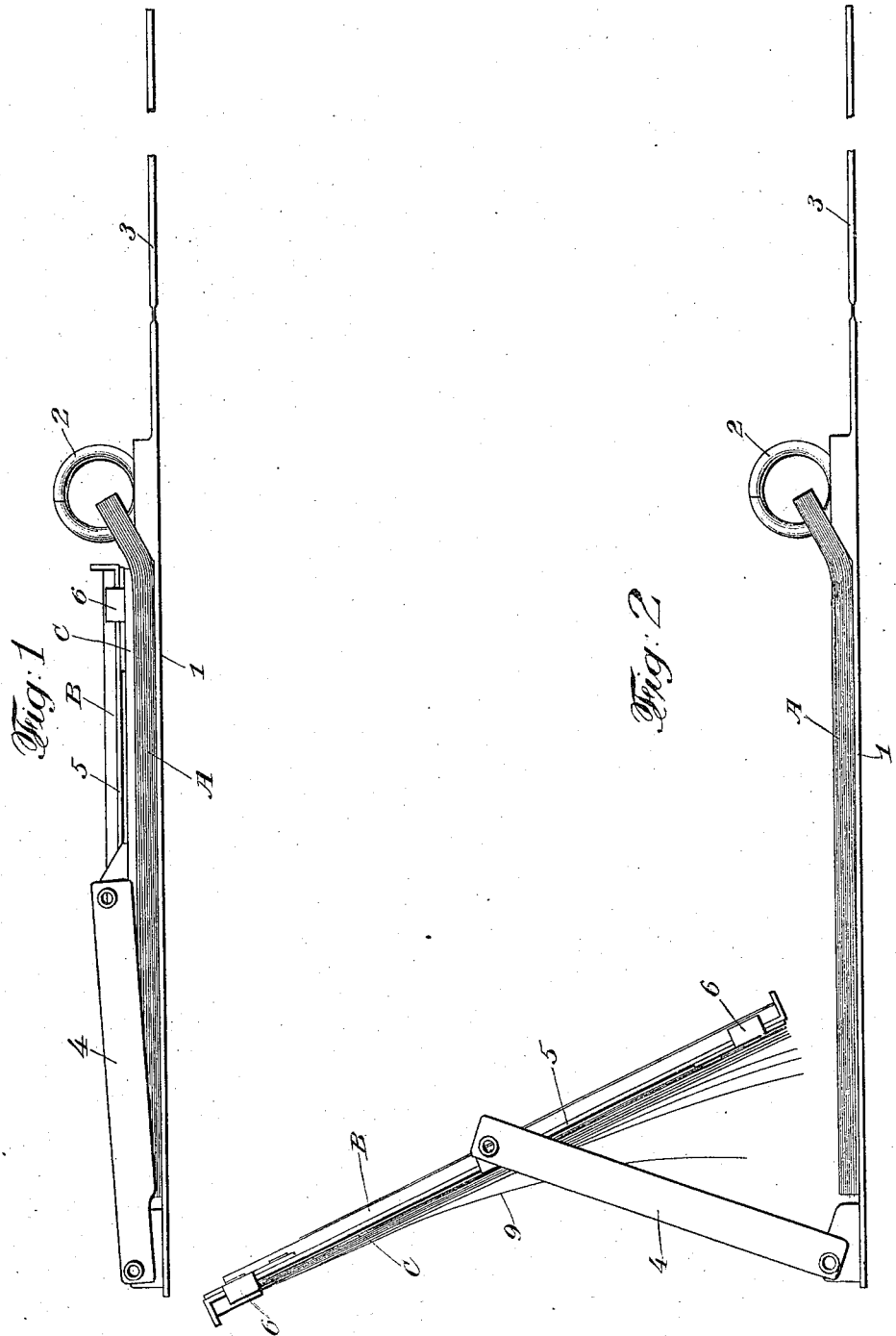

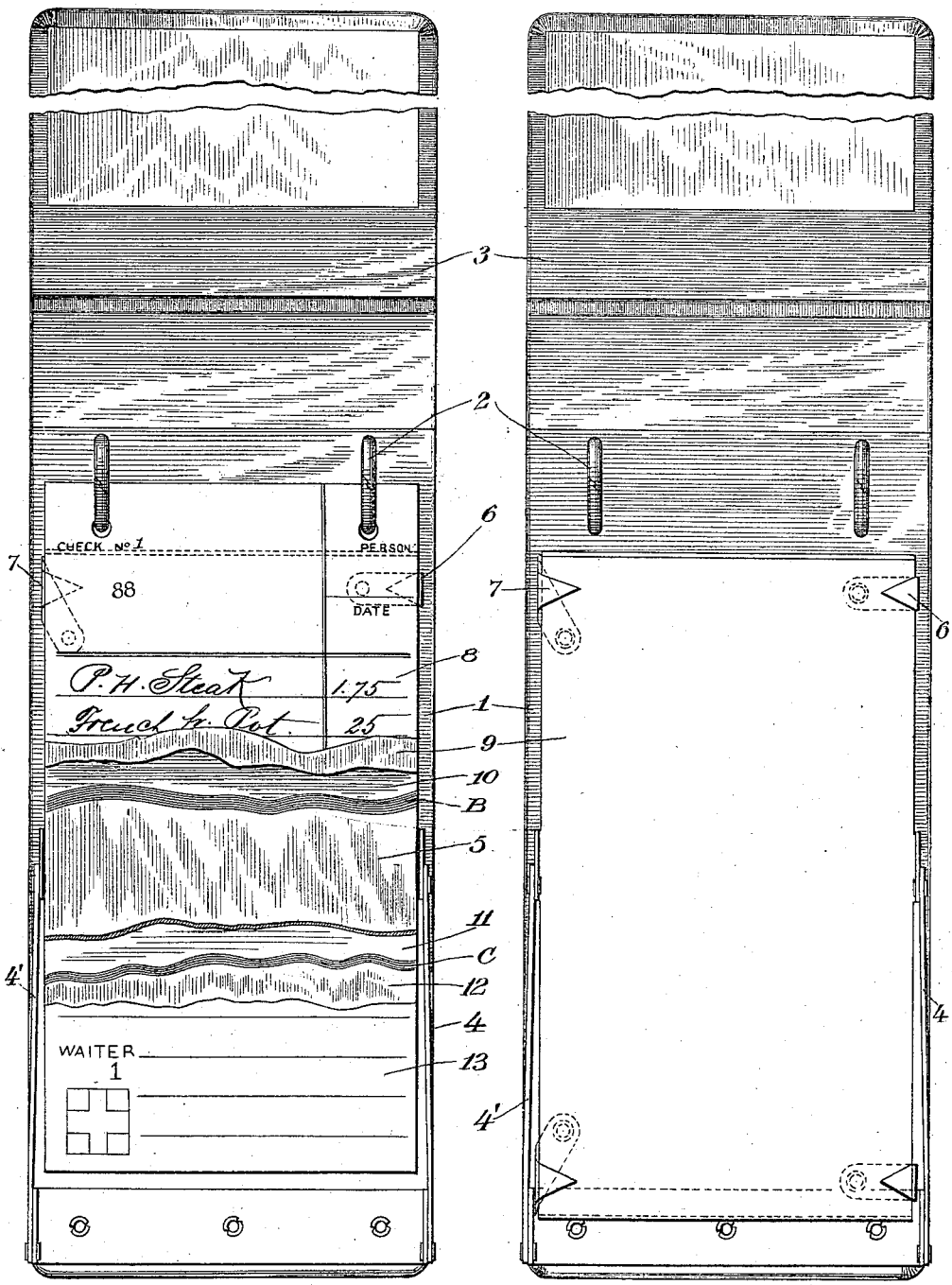

FRED B. JORDAN, OF WINCHESTER, MASSACHUSETTS, ASSIGNOR TO HOTEL SECURITY CHECKING COMPANY, OF MEDFORD, MASSACHUSETTS, A CORPORATION OF MAINE.

MANIFOLD-CHECK DEVICE.

965,527.  Specification of Letters Patent.  Patented July 26, 1910.

Application filed April 19, 1910. Serial No. 556,371.

*To all whom it may concern:*

Be it known that I, FRED B. JORDAN, a citizen of the United States, and a resident of Winchester, Middlesex county, State of Massachusetts, have invented certain new and useful Improvements in Manifold-Check Devices, of which the following is a specification.

My invention relates to manifold check devices and more particularly to holders for "original" and "carbon" checks or blanks for use in hotels, restaurants or other places where it is desired to keep duplicate memoranda or orders.

The object of my invention is to provide a holder for carrying a set of "original" or "guest" checks or blanks, and two separate sets of "carbon" or duplicate checks, the different sets of checks or blanks being so arranged that the "original" checks may be brought into register with either set of the "carbon" or duplicate checks in order to duplicate upon a check of either of the "carbon" sets, a memorandum or order written on the "original" check.

It is desirable in restaurants and hotels to audit the cigar and liquor orders, known as the "bar" account, separately from the "kitchen" orders, since these are separate and distinct departments. In check holding devices where only one set of "carbon" checks or blanks is provided, it is necessary to present to both the "kitchen" and the "bar" departments "carbon" orders of the same series so as to obtain supplies from either department. If a waiter in an effort to defraud the house, succeeds in getting supplies from the kitchen without leaving behind him the duplicate order, as sometimes happens, it is possible for him to use this "carbon" order over again in connection with some other customer, and he can do this with either the "kitchen" department or the "bar" department. If the "carbon" order as originally filled out properly belonged to the "kitchen" department, and was presented there but fraudulently retained or brought away by the waiter, it is easier for him thereafter to use this same "carbon" order with the "bar" department without detection, for if he presented the same order a second time in the "kitchen" department, there would be a greater chance of the fraud being discovered. The present invention makes it possible to use "carbon" orders of a distinctive character for each of the two departments, and this prevents the "carbon" order intended for either department from being thereafter used in the other department. Also in auditing these vouchers after a day's business it is necessary, where the same kind or series of "carbon" orders are used for both departments, to go over all vouchers of both departments and pick out the "kitchen" orders in order to audit them; and after this is done it is necessary to again go over the vouchers to audit the "bar" accounts or orders. Further, where the same series of carbon orders is used for both departments, it is impossible to keep the vouchers of any department consecutively numbered in order to quickly compare and check them with the sale records kept by each of these departments, and considerable time and labor are required in arranging these checks or vouchers after a day's business into their proper order so as to compare them with the records kept by the "kitchen" and "bar" departments. By providing two separate and distinct sets of "carbon" or duplicate checks, or blanks, one for the "kitchen" orders and the other for the "bar" orders, and by having each set serially numbered and of a distinguishing character or style, the department to which any "carbon" or duplicate checks belongs can be instantly recognized, and each department can keep a complete file of vouchers for their sales, which can be readily compared with the sale records of the two departments, at the end of the day's business, and the labor of auditing thus cut fully in half. The separate voucher system also effectually prevents a waiter from receiving a duplicate order of goods from a department on a single voucher.

Other objects of my invention will more fully appear from the following description, taken in connection with the accompanying drawings, in which—

Figure 1 shows a side elevation of the preferred form of my invention with the holder for the "carbon" checks in its normal position in register with the set of "original" checks; Fig. 2 is a side elevation of the device with the holder for the "carbon" checks shown as moved out of its registering position so as to be swung on its pivot; Fig. 3 is a top plan view of the device as shown in Fig. 1, and Fig. 4 is a top plan view of the device with the sheets in position to be used and with certain parts broken away.

Referring to Figs. 1 and 2, 1 is a main supporting member, preferably in the form of a stiff or flexible back plate, carrying a set of "original" or "guest" checks or blanks A preferably removably secured thereto as by means of split rings 2 mounted upon a thickened portion of the back plate adjacent to the end at which is attached a cover or front piece 3. Obviously any other suitable attachment may be provided for these checks, such as one permitting the checks to be swung out parallel to the plane of the supporting back in order to bring another check of the set into position to be used. At the opposite end of the back plate upon any suitable base, are mounted two arms 4, 4' (Fig. 3) between which is pivoted a holder 5 for carrying the two sets of "carbon" or duplicate checks. One set of "carbon" or duplicate checks B is preferably secured upon one side of the holder 5 by means of clips 6 and 7, the latter clip being pivoted to the holder so as to be swung in and out to permit the replacing of the checks as they are used up. A second set of "carbon" or duplicate blanks C is similarly secured upon the opposite side of the holder 5, and preferably at the opposite end thereof from which the checks B are secured. The checks C are preferably readily distinguishable from the checks B by being of a different color or shape, or by having a characteristic mark or style of some kind, and the checks of each set are preferably separately serially numbered. The two sets of checks are preferably reversely arranged upon the pivoted holder so that either set, when swung down in register with the supporting back may be uppermost, and in correct position to receive the duplicate order as written on the "original" check.

Referring to Fig. 4, 8 represents the first of the "original" or "guest" checks upon which the order is to be written, with the lower part of the sheet torn away. 9 is a part of the carbon or transfer paper carried on top of the set of "carbon" checks B, and 10 represents the first of the "carbon" checks B upon which the order is to be duplicated. 5 is a part of the holder or support for the two sets of "carbon" checks, which is preferably in the form of a flat piece of wood, fiber, cardboard, or thin sheet metal. The bottom check of the second set of "carbon" checks C is shown on the opposite side of the holder at 11. 12 is the transfer sheet resting upon the set of checks C, and at 13 is shown the lower part of the second of the "original" checks A.

The operation of the device is as follows: With the device in the position shown in Fig. 1, if it is desired to take an order the waiter swings the "carbon" holder 5 up into the position shown in Fig. 2, and then throws the first of the original checks A back on the cover, after which he swings the carbon holder 5 back down into register with the back plate with the "kitchen" checks uppermost, assuming that an order for the kitchen is to be taken. He then swings the "original" check back upon the carbon paper of the duplicate "kitchen" checks, and proceeds to take the order for the kitchen. After the "kitchen" order is thus taken, if it is desired to take a "bar" order, either for liquors or cigars, the original check is thrown over upon the cover again, and the movable member 4—4' swung out from the supporting back a sufficient distance to permit the holder 5 to be swung on its pivot to bring the "bar" checks uppermost, whereupon the movable member 4—4' is moved to bring the holder 5 again into register with the back plate, and the original or "guest" order is now swung over upon the carbon paper of the "bar" checks in order to duplicate the "bar" order to be taken.

In the illustrated form of my invention, in swinging the holder 5 on its pivot to present the desired set of checks uppermost, it will be found more convenient to swing the holder in a direction such that the loose edges of the lower set of "carbon" checks will not engage the loose edges of the original checks so as to tend to lift up the latter. The desired direction of rotation will depend upon the edges of the holder 5 to which the respective sets of "carbon" checks are secured. With the "carbon" checks secured as shown in the drawings, the rotation of the holder 5 should always be away from the user and toward the supporting back. It will thus be seen that by the use of my invention separate "bar" and "kitchen" checks may be conveniently provided for the bar and kitchen departments, which sets of checks may have separate serial numbers, so that no matter how many "bar" orders may be taken without "kitchen" orders, or vice-versa, the serial order of the separate sets of checks will always be maintained as they are filed in the different departments, thus greatly facilitating the accounting at the end of the day's work, and also preventing any possibility of the waiter presenting a voucher to either department upon which he may have received supplies in another department.

While I have described my invention with some particularity in what I now believe to be its best form, I do not wish to be understood as limiting myself to the specific arrangement and construction of the apparatus shown and described, for it is obvious to those skilled in the art that various changes and modifications may be made without departing from the spirit of my invention, such as changes in the manner of pivotally mounting the holder, or securing the two sets of "carbon" checks at the same end of the holder 5 or to the side edge thereof; or the carrying of the set of original checks A by the back-plate in any desired manner to be placed upon the "carbon" or duplicate checks when they are swung down into position, and I do not wish to be understood as limiting myself to any construction or arrangement of the holder or check blanks other than as indicated in the appended claims.

What I claim as new and desire to secure by Letters Patent, is:

1. In a manifold check device, the combination of a main support, a pivoted blank holder adapted to carry sets of blanks on opposite sides thereof, means for pivotally carrying said holder and movably connecting the same with the main supporting member whereby either side of the blank holder may be faced upwardly and moved into register with said main supporting member.

2. In a manifold check device, the combination of a main support, a pivoted blank holder, sets of "carbon" blanks carried on opposite sides of said holder, means for pivotally carrying said holder and movably connecting the same with the main supporting member, whereby either set of "carbon" blanks may be faced upwardly and moved into register with said main supporting member, a set of "original" blanks carried upon the main supporting member and adapted to be swung upon the upper of said set of "carbon" blanks when the latter is moved into register with the main support, and a transfer paper for transferring a memorandum from the "original" to one of the "carbon" blanks.

3. In a manifold check device, the combination of a main supporting member, a part mounted on and movable with respect to said member, a blank holder pivotally mounted upon said part whereby the holder may be moved into register with the supporting member with either of two of its surfaces facing upwardly, one or more blanks carried in each of said surfaces of the holder, and one or more other blanks carried by the main supporting member and movable upon the upper of said first mentioned blanks when the latter is moved into register with the main supporting member.

4. In a manifold check device, the combination of a main supporting member, a blank holder having sets of "carbon" blanks on opposite sides thereof and pivotally mounted to present either set of blanks uppermost, means upon which said holder is pivotally mounted and movably connecting the holder with the said main supporting member for moving the former into register with the latter, a set of "original" blanks carried by the main support and movable upon the upper of the registering blanks, and a transfer paper for transferring a memorandum from the "original" to the "carbon" blank.

5. In a manifold check device, the combination of a supporting back, a member movably mounted on said back, a blank holder having sets of blanks on opposite sides thereof, the blanks of one set being distinguishable from those of the other set, said holder being swingingly mounted on said movable member and movable thereby to present either set of blanks uppermost and to be moved into and out of register with the supporting back, a set of blanks on the supporting back operatively related to the blanks on the holder, to be swung upon the upper of said sets of blanks when the holder is brought into register with the back.

6. In a manifold check device, the combination of a supporting back, a member movably mounted on said back, a blank holder having sets of blanks on opposite sides thereof, the blanks of one set being reversely arranged on the holder and of a different style from those of the other set, said holder being swingingly mounted on said movable member and movable thereby to present either set of "carbon" blanks uppermost and to be moved into and out of register with the supporting back, a set of "original" blanks on the upper surface of said back arranged to be swung upon the upper of said "carbon" blanks when the holder is brought into register with the supporting back, and a transfer paper for transferring a memorandum from the "original" to the "carbon" blank.

7. In a manifold check device, the combination of a supporting back, a member movably mounted on said back, a blank holder carrying two sets of "carbon" blanks, the blanks of one set being distinguishable from those of the other set, and the respective sets of blanks being reversely arranged on opposite sides of said holder, the holder being swingingly mounted on said movable member and movable thereby to present either set of blanks uppermost, and to be moved into register with the supporting back, a set of "original" blanks carried on the upper surface of the supporting back and foldable upon the upper blank of said "carbon" sets when the holder is brought into register with the supporting back, and a transfer paper for transferring a memorandum from the "original" to the "carbon" blank.

8. In a manifold check device, the combination of a supporting back, a member movably mounted on said back, a blank holder carrying two sets of "carbon" blanks, the blanks of one set being distinguishable from those of the other set, and the respective sets of blanks being reversely arranged on opposite sides of said holder, and removably secured at opposite ends thereof, the holder being swingingly mounted on the said movable member to present either set of "carbon" blanks uppermost, and movable by said member into register with said back, a set of "original" blanks arranged on the upper surface of the supporting back to be swung upon the upper blank of said "carbon" sets when the holder is brought into register with the back, and a transfer paper for transferring a memorandum from the "original" to the "carbon" blank.

9. In a manifold check device, the combination of a supporting back, a blank holder carrying two sets of "carbon" blanks, the blanks of one set being distinguishable from those of the other set, and arranged on opposite sides of said holder, a movable member on which said holder is mounted for moving the latter into register with the supporting back, means intermediate the ends of the holder for swingingly mounting the same on said movable member to present either set of blanks uppermost, a set of "original" blanks carried on the upper surface of the supporting back to be swung upon the upper blank of said "carbon" sets when the holder is brought into register with the back, and a transfer paper for transferring a memorandum from the "original" to the "carbon" blank.

10. In a manifold check device, the combination of a supporting back, a blank holder carrying two sets of "carbon" blanks, the blanks of one set being distinguishable from those of the other set, and arranged on opposite sides of said holder, a movable member on which said holder is mounted for moving the latter into register with the supporting back, means substantially at the center of the holder for swingingly mounting the same on the movable member to present either set of blanks uppermost, a set of "original" blanks carried on the upper surface of the supporting back, and foldable upon the upper blank of said "carbon" sets when the holder is brought into register with the back, and a transfer paper for transferring a memorandum from the "original" to the "carbon" blank.

11. In a manifold check device, the combination of a supporting back, a blank holder carrying two sets of "carbon" blanks, one set on each side thereof, a movable member mounted at one end of the supporting back for carrying the holder and moving the same into and out of register with said back, means substantially at the center of the holder for swingingly mounting the same on said movable member so as to present either set of blanks uppermost, a set of "original" blanks carried by the supporting back at the opposite end thereof from said movable member so as to be swung upon the upper blank of said "carbon" set when the holder is brought into register with the back, and a transfer paper for transferring a memorandum from the "original" to the adjacent "carbon" blank.

12. In a manifold check device, the combination of a supporting back, a blank holder carrying two sets of "carbon" blanks, the blanks of one set being distinguishable from those of the other set, and the respective sets of blanks being reversely arranged and detachably mounted on opposite sides of the said holder, a movable member pivotally mounted on one end of the supporting back for carrying the holder and moving the same into and out of register with said back, means substantially at the center of the holder for swingingly mounting the same on said movable member so as to present either set of blanks uppermost, a set of "original" blanks carried on the upper surface of the supporting back and removably secured thereto at the opposite end of the back from said movable member to be swung upon the upper blank of said "carbon" sets when the holder is brought into register with the back, and a transfer paper for transferring a memorandum from the "original" to the adjacent "carbon" blank.

In testimony whereof, I have signed my name to this specification, in the presence of two subscribing witnesses.

FRED B. JORDAN.

Witnesses:
BERTHA E. CLARK,
CLAUDE L. ALLEN.